R. FUKUDA.
ELASTIC TIRE.
APPLICATION FILED MAR. 28, 1916.
1,238,125.
Patented Aug. 28, 1917.
2 SHEETS—SHEET 1.
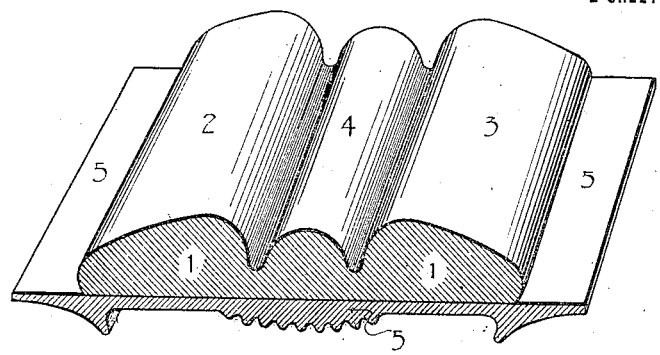
Fig. I
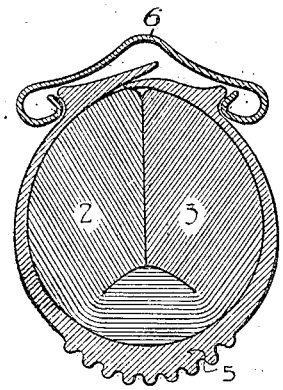
Fig. II
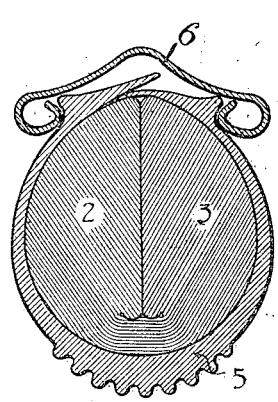
Fig. IV
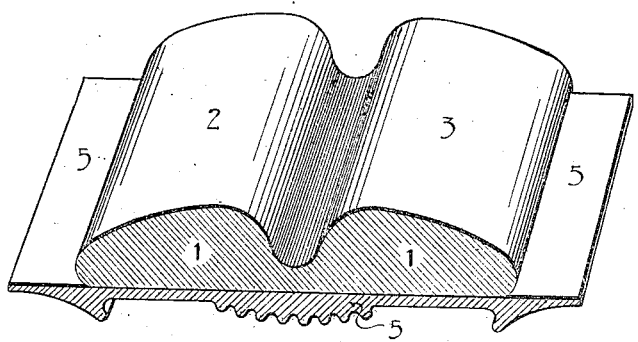
Fig. III
Inventor
Risuke Fukuda
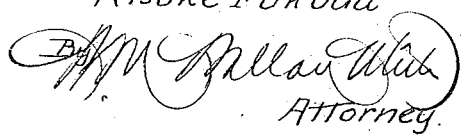
Attorney

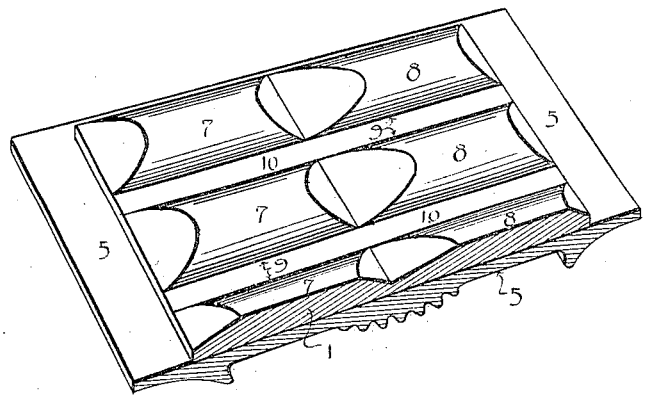
Fig. V
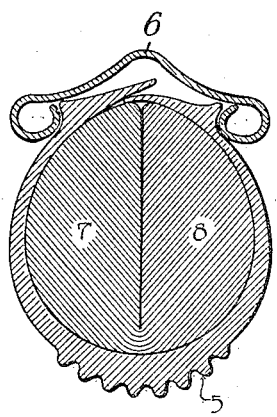
Fig. VI
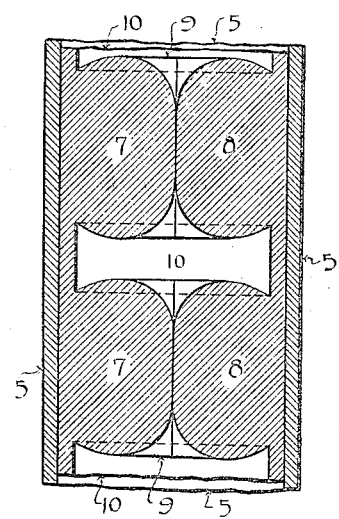
Fig. VII

UNITED STATES PATENT OFFICE.

RISUKE FUKUDA, OF YOKOHAMA, JAPAN.

ELASTIC TIRE.

1,238,125.  Specification of Letters Patent.  Patented Aug. 28, 1917.

Application filed March 23, 1916. Serial No. 87,158.

*To all whom it may concern:*

Be it known that I, RISUKE FUKUDA, a subject of the Emperor of Japan, residing at No. 7 Ichome, Yoshida-Machi, Yokohama, Japan, have invented new and useful Improvements in Elastic Tires, of which the following is a specification.

This invention relates to improvements in an' elastic tire and it consists of the combination of the usual outer casing with a spongy core.

The object of this invention is to make a solid non-puncturable tire, dispensing with the ordinary pneumatic tube.

In the accompanying drawings forming part thereof, I have illustrated a form of embodiment of the invention, in which drawings similar reference characters designate corresponding parts, and in which:

Figure 1 is a perspective view of a part of the tire laid flat and Fig. 2 is a transverse sectional view of the tire.

Fig. 3 is a perspective view of a part of a tire of a modified form. Fig. 4 is a transverse sectional view thereof.

Fig. 5 is a perspective view of a part of another modified form. Fig. 6 is a transverse sectional view and Fig. 7 is a longitudinal sectional view of the form shown in Fig. 5.

In the drawings, 1 designates a spongy rubber belt having a number of longitudinal ridges which when folded inwardly form a complete circle in cross section when compressed in a tire casing.

In the construction shown in Figs. 1 and 2, the belt 1 has three longitudinal ridges 2, 3 and 4 on its inner surface. The central ridge 4 is a semi-circle in its cross section and the ridges 2 and 3 have a semi-egg shaped cross section.

A complete tire comprises a combination of the belt 1 with the outer casing 5. The belt 1 is fastened to the inside of the casing 5 by pasting or any other suitable means. If desired, these members may be placed without any fastening means.

The outer casing 5 and the belt 1, thus connected, are rolled inwardly together and they are to be attached to the rim 6. When they are rolled inside, the ridges 2, 3 and 4 contacting each other with their surfaces, form a solid spongy core of a complete circular section.

By this construction, the tire has no necessity of charging with air and there is no objection at all to its being punctured and also its construction is very simple.

In the construction shown in Figs. 3 and 4, the belt 1 has two ridges 2 and 3 having a proper section to form a core of a circular section when the belt 1 has been rolled inside.

The ridges may be arranged laterally, if desired. Figs. 5 to 7 show this modification. In this modification, a set of ridges, consisting of members 7 and 8, is provided laterally on one face of the belt 1 and this set of the ridges has a proper form to complete a circular disk when the belt is rolled inside. A number of such sets of the ridges is provided parallel along the length of the belt 1, leaving an equal space 10 between each set. By this construction, the weight of the tire may be greatly decreased and it may also be used for light wheels without any objections.

I claim—

1. A core for tires comprising a strip of yieldable material having longitudinal ridges along its edges and a longitudinal recess between the ridges, said ridges being substantially semi-egg shaped in cross section, said strip being foldable along said recess to position the inner faces of said ridges in abutting relation to completely fill said recess.

2. A core for tires comprising a strip of material having longitudinal ridges along its edges and a longitudinal recess between the ridges and also provided with an intermediate longitudinal ridge in said recess spaced from the aforesaid ridges, the outer ridges being foldable to position the inner faces of the outermost ridges in abutting relation with each other and with said intermediate ridge to completely fill said recess.

3. A core for tires comprising a strip of material having longitudinal ridges along its edges and also having a relatively narrow longitudinal recess between the ridges, the inner faces of the ridges tapering toward the outer edges of the strip, said ridges being foldable to position said tapering faces of the ridges in abutting relation throughout the length of the core to completely fill said recess.

4. A vehicle tire comprising a casing, a core formed of a strip of yieldable material provided with longitudinal ridges and an intervening recess, said strip being foldable inwardly from its edges to dispose the inner faces of said ridges into abutting relation throughout the entire area of said faces and completely fill said recess and thereby provide a solid core.

5. A core for tires composed of a strip of yieldable material provided with oppositely disposed spaced ridges, the strip being foldable to position the inner faces of the ridges in abutting relation to completely fill said recess and render the core solid throughout its length.

In testimony whereof I have signed my name to this specification in the presence of two subscribing witnesses.

RISUKE FUKUDA.

Witnesses:
S. OMURA,
GENJI KURIBARA.